United States Patent [19]

Frihart

[11] Patent Number: 4,975,498
[45] Date of Patent: Dec. 4, 1990

[54] THERMALLY-CURABLE AMINOAMIDE ACRYLATE POLYMER

[75] Inventor: Charles R. Frihart, Lawrenceville, N.J.

[73] Assignee: Union Camp Corporation, Wayne, N.J.

[21] Appl. No.: 284,380

[22] Filed: Dec. 14, 1988

[51] Int. Cl.$^5$ ............................................. C08G 69/48
[52] U.S. Cl. ................................ 525/420.5; 525/426; 525/435
[58] Field of Search ...................... 525/420.5, 426, 435

[56]  References Cited
U.S. PATENT DOCUMENTS 3,127,365  3/1964  Floyd ............................. 525/420.5

Primary Examiner—Harold D. Anderson
Attorney, Agent, or Firm—Edward J. Sites

[57] ABSTRACT

A thermally-curable acrylate-modified aminoamide resin is the Michael addition product of an aminoamide thermoplastic polymer with a polyol ester having multiple acrylate groups, to which is added a free radical curing initiator.

17 Claims, No Drawings

THERMALLY-CURABLE AMINOAMIDE ACRYLATE POLYMER

BACKGROUND OF THE INVENTION

1. Field of the Invention

The invention relates to new aminoamide acrylate polymer compositions useful as hot melt adhesives which are thermally curable. In particular it relates to aminoamide acrylate polymer compositions which perform as hot melt adhesives which are subsequently curable. It also relates to the cured polymers of the invention, and to the process of manufacture of these polymers, both cured and uncured.

2. Brief Description of the Prior Art

Polyamides are a well known class of thermoplastic polymer. Most polyamides offer no practical means by which they can be cured to thermoset polymers. A known subclass of polyamides are the aminoamide polymers which have free (i.e. non-acylated) amino groups. Certain of these are useful hot melt adhesives, but if they are used in a non-crosslinked thermoplastic mode, they are subject to cold flow, remelting, solvent attack and other modes of deterioration. It is known to crosslink aminoamides, in fact they are often used themselves as crosslinking agents for epoxy resins, but such crosslinking is generally accomplished by means of a "two package" system, the aminoamide resin being one package, and a coreactive resin, typically an epoxy resin, being the other package. Such "two package" systems are commercially used, but have the shortcomings of requiring two containers, measuring and mixing at the point of use, limited working time after the mixing, and they generally require substantial time and/or heating to effect partial cure, to give green strength. Even further time and/or heating is required for complete cure.

It has been known further to blend acrylate polymers into certain polyamides for improved properties such as for hot melt adhesive uses, as in U.S. Pat. Nos. 4,132,690 (E. Ernstman et al.) and 4,374,231 (Doucet), for molding resin uses as in U.S. Pat. No. 4,247,665 (Daniels et al.), and for pressure-sensitive adhesive uses, as in U.S. Pat. No. 4,696,965 (Rasmussen). However, the acrylate polymers in all of these instances had the acrylate group already polymerized and thus rendered nonfunctional. Thus, such blends were in most cases not chemically linked by covalent bonds and in all cases were not capable of being post cured to render them thermoset (infusible). Grafts and copolymers of polyamides and acrylates, suitable for adhesive uses, are taught in U.S. Pat. Nos. 4,247,665 (Daniels et al.) and 4,378,448 (Park et al.) but these also had the acrylate group used up in the grafting or copolymerization and so were not thermally curable.

Curable adhesives have been made using acrylate groups as the curing means as in U.S. Pat. Nos. 4,153,776 and 4,430,479 (Merton et al.) but these did not utilize aminoamides.

Our invention provides an improvement over the prior art in that it makes possible a one package system, with good storage properties, with good hot melt adhesive properties, and with the important added ability to be cured thermally. Thus, it can provide hot melt adhesives, varnishes, lacquers, inks and encapsulants which have good initial (green) strength properties, but, in addition, are rapidly curable to a state where they have improved adhesive strength and gain resistance to cold flow, remelting (or softening with heat), blocking, solvent attack, and moisture damage. These characteristics are especially valuable in hot melt adhesives which must perform under challenging conditions of temperature, humidity, and mechanical stress.

SUMMARY OF THE INVENTION

The invention is an acrylate-modified aminoamide resin which comprises the Michael addition product of an aminoamide thermoplastic polymer with a polyol ester having a multiplicity of acrylate ester groups, the ratio of the initial acrylate groups of the polyol ester to the initial amino-hydrogen groups of the aminoamide polymer being greater than 0.5 up to about 8.0. The composition of the invention further comprises an effective amount of an initiator for thermal curing.

The invention also comprises the method for the production of the thermally curable resin by means of the Michael addition. The invention also comprises the thermally cured resin made by curing the acrylate-modified aminoamide resin, and the method for the production of the thermally cured composition by exposing the acrylate-modified aminoamide resin to thermal curing conditions.

Prior to cure, the product of the invention is an effective hot melt adhesive. After cure, the product of the invention is more cohesive and adhesive, less deformable, more heat resistant, more solvent resistant and more moisture resistant than the aminoamide precursor and related uncured thermoplastic polyamide resins.

DETAILED DESCRIPTION OF THE INVENTION

The invention is a thermally-curable acrylate-modified aminoamide resin which comprises the Michael addition product of an aminoamide thermoplastic polymer with a polyol ester having a multiplicity of acrylate ester groups (i.e. two or more acrylate ester groups), the ratio of the initial acrylate groups of the polyol ester to the initial amino-hydrogen groups of the aminoamide polymer being greater than 0.5 to less than about 8.0. Thus, each amino-hydrogen group becomes reacted with an acrylate group leaving additional acrylate groups unreacted in sufficient numbers to enable the subsequent curing step to be carried out when desired. The product of the invention further comprises an effective amount of an initiator for thermal curing, preferably a free-radical-generating initiator of sufficient stability to survive mixing, storage, and the hot melt application conditions but capable of curing the resin on thermal activation at the desired temperature and time.

The compositions of the invention, most broadly, can be made using any thermoplastic aminoamide polymer. Most preferable, however, is the reaction of the polyamides with a monomer containing at least three acrylate groups in a ratio such that the reaction product has at least two free acrylate groups.

In a preferred group of compositions within the invention, the aminoamide is derived (i.e. produced) from a polymerized unsaturated fatty acid, such as the material known commercially as dimer acid, these aminoamide polymers having an amine number of greater than about 1 and less than about 100; even more preferably, greater than about 3 and less than about 40 (the amine functionality is expressed in a conventional manner in terms of mg. of equivalent KOH/g of sample). With lower functionality, too little acrylate is present for good curing. With higher functionality, there is risk of premature gelation or at least excessive viscosity.

Such preferred aminoamides include those produced from dimer acid cocondensed with another dibasic acid of from 2 to about 20 carbon atoms, which can be an aliphatic acid such as oxalic, azelaic, sebacic, dodecanedioic, or eicosanedioic, or an aromatic acid such as isophthalic, and, as the amine component, a diamine of from 2 to about 36 carbon atoms, such as ethylenediamine, hexamethylenediamine, diaminopropane, piperazine, 4,4'-dipiperidinyl alkane, toluenediamine, methylenedianiline, xylenediamine, methylpentamethylenediamine, diaminocyclohexane, aminoethylpiperazine, polyetherdiamine, and diamines made from dimer acid. Higher polyamines can be included in limited amounts small enough to avoid premature gelation; examples are diethylenetriamine, triethylenetetramine, tetraethylenepentamine, and bishexamethylenetriamine. Higher molecular weight polyetherdiamines can also be used. Suitable aminoamides are commercially available, for example, as UNI-REZ 2643, 2646, 2648 and 2654 (commercially available from Union Camp Corporation, Wayne, N.J.). The preparation of members of this class of aminoamide polymer from dimerized fatty acid is described by Peerman et al. in U.S. Pat. No. 3,377,303 (1968).

The term "dimer acid" is in common use in the resin field and refers to polymeric or oligomeric fatty acids typically made from addition polymerization of unsaturated tall oil fatty acids. These polymeric fatty acids typically have the composition 0–10% $C_{18}$ monobasic acids, 60–95% $C_{36}$ dibasic acids, and 1–35% $C_{54}$ tribasic and higher polymeric acids. The relative ratios of monomer, dimer, trimer and higher polymer in unfractionated "dimer acid" are dependent on the nature of the starting material and the conditions of polymerization and distillation. Methods for the polymerization of unsaturated fatty acids are described for example in U.S. Pat. No. 3,157,681. The use of hydrogenated dimer acids improves the color and oxidative stability of the polyamides of the invention, and is within the scope of the invention, as is the use of a distilled fraction, such as the dimer fraction of dimer acid.

The polyol ester having a multiplicity of acrylate ester groups can be an ester of acrylic or methacrylic acid, or mixture thereof, having from two to about eight such acrylic or methacrylic acid groups. In the present discussion, it should be understood that the generic term "an acrylate" is meant to include methacrylate, and "the acrylic acid" is meant to include methacrylic acid. The polyol should have a minimum of two alcoholic hydroxyl groups before esterification. It is not necessary that all of the alcoholic groups be esterified with the acrylic acid, as long as at least two are so esterified on the average.

Thus, suitable polyol esters of acrylic acids include the following: ethylene glycol diacrylate or dimethacrylate, butanediol diacrylate or dimethacrylate, diethylene glycol diacrylate or dimethacrylate, glycerol trimethacrylate, sorbitol triacrylate, trimethylolethane triacrylate, trimethylolpropane triacrylate, ethoxylated trimethylolpropane triacrylate, pentaerythritol tri- or tetraacrylate or tri- or tetramethacrylate, and also multifunctional acrylates or methacrylates of dipentaerythritol or tripentaerythritol, sucrose pentamethacrylate, bisphenol-A bis(hydroxypropyl) ether diacrylate, and the like.

By Michael addition is meant the addition reaction of an amino group across an activated double bond, typically by an ester, to form a new more highly alkylated amine, thus:

$$RR'NH + C{=}CC(O) \rightarrow RR'NC{-}CHC(O).$$

Such reactions generally proceed spontaneously with moderate heating. R and R' in the above formula can be a monovalent carbon radical or hydrogen. In the present context, at least one of R and R' is a monovalent non-carbonyl carbon radical which is the carbon terminus of the aminoamide polymer chain. R and R' may also be aminodiethylene, as, for example, when piperazine is used.

The Michael addition is exothermic and one means for noting its completion is the cessation of heat evolution. Other physical means such as leveling out of the viscosity may be used to detect completion of the Michael addition reaction. The Michael addition can also be followed analytically, by many of the well known analytical methods for double bond assay, such as nmr or infrared. For example, the ratio of olefinic protons to saturated aliphatic protons can be measured by nmr, and will be seen to level out at a reduced ratio relative to the initial reaction mixture as the Michael addition comes to completion. The infrared absorption bands characteristic of the double bond will also be seen to level out as the Michael addition reaction comes to completion. It is even possible to note the substantial completion of the reaction by the disappearance of the characteristic odor of acrylate monomer and/or a separate phase. As will be obvious to one skilled in resin synthesis, once the reaction conditions for completion of the desired reaction are determined by analytical means, further batches made from the same reactants can be made by merely conforming to the same time and temperature regime.

The ratio of the aminoamide to the acrylate should be such that the ratio of the initial acrylate groups of the polyol ester to the initial amino groups of the aminoamide polymer is greater than one so that each amino group becomes reacted with an acrylate group leaving additional acrylate groups unreacted. To assure this relationship to the first approximation is a matter of simple arithmetic, the amino functionality of the aminoamide resin and the acrylate functionality of the polyol acrylate being known quantities. For instance, if a diacrylate is used, then the quantity of diacrylate must be about 1.0 mole per molar equivalent of amino functional groups in the aminoamide resin, so that when the Michael addition is over, the product will have some unreacted acrylate group to serve in the curing step. It should be noted that a primary amino group is equivalent to two amino functions since the Michael addition can go twice on it, whereas a secondary amino group is equivalent to one amino function. One skilled in the art of resin production will recognize that empirical adjustment slightly to one side or the other of the stoichiometric relationship may be useful to overcome such factors as the presence of hindered functional groups.

Since the aminoamide thermoplastics used in the invention are not highly polyfunctional, gelation will rarely be encountered, however if it does occur during the Michael addition, reduction in the amount or the amino number of the aminoamide, or in the polyfunctionality of the acrylate suffices to escape the problem.

A preferred aminoamide resin is amine-terminated hot-melt polyamides, such as UNI-REZ 2622, 2636, 2643, 2646, 2648, and 2654, and preferred polyfunctional acrylate resins are trimethylolethane triacrylate, trimethylolpropane triacrylate, ethoxylated trimethylolpropane triacrylate, pentaerythritol tri- or tetraacrylate or tri- or tetramethacrylate. With these preferred reactants, a preferred ratio for reacting them is 0.5 to 8.0 acrylate groups per amino group.

In order to carry out the Michael addition reaction, the two reactants have to be brought into a common phase. While this can be accomplished by use of a solvent such as methanol or ethylene dichloride, we find it advantageous to avoid the use of solvent with its attendant recovery problems, by merely melting the polyamide and admixing it with the acrylate ester, which is usually a liquid or an easily melted solid. Since at least one of the reactants is a solid, it is preferred that the reaction mixture be heated at least up to the softening point of the lowest melting reactant. The reaction temperature will generally not exceed 190 deg. C, since at higher temperatures, some cracking or premature polymerization of the reaction product can occur.

The addition can be carried out in any suitable vessel having resin mixing capabilities, thus a kettle with a stirrer may be used, a Banbury mixer, or an extruder.

Generally, no purification steps are needed after the Michael reaction has completed itself. It is possible to extract, at this point, a temporary inhibitor such as hydroquinone, which may have been added to inhibit undesired thermal polymerization during the Michael addition reaction. Such extraction can be accomplished by solvents such as acetone or aqueous alkali. However, it is preferred to run the reaction without a solvent and not to use any solvent processing step after the Michael addition reaction. The reaction product is generally a colorless to light yellow to light brown solid at room temperature. It is conveniently pelletized, granulated or powdered prior to packaging.

The composition further includes a source of free radicals, also known as an initiator. This must be a catalyst which is stable under the storage conditions of the product. One category of suitable catalysts are those with a half-life of 10 hours at above about 50 deg. C., for example t-butyl peroxypivalate, lauroyl peroxide, benzoyl peroxide, t-butyl peroctoate, t-butyl peroxy isopropyl carbonate, t-butyl perbenzoate, di-t-butyl peroxide and t-butyl hydroperoxide, azobisisobutyronitrile, cumyl hydroperoxide, dicumyl peroxide, t-butyl cumyl peroxide, bis(t-butylperoxy)diisopropylbenzene, and ethyl-O-benzoyllaurohydroximate. The preferred initiator, because of good lifetime in storage and effectiveness in curing is dicumyl peroxide. These initiators can be added before, during, or preferably after, the Michael addition reaction. The preference for addition after the reaction is to avoid premature activation when the Michael reaction mixture is warmed up deliberately or by the exotherm of the reaction. Initiator levels of from about 0.01 to about 5%, more preferably about 0.02 to about 2%, are generally found to give an adequate balance between shelf life and cure rate at the desired cure temperatures. With the initiators in the lower temperature range of activity, the product containing them should either be used quickly or stored in refrigerated conditions. With initiators in the higher temperature range, typically a half life of 10 hours at above about 70 deg. C., the product will have a useful shelf life at ambient temperature.

With heat activatable curing initiators, the curing temperature will generally be between 70 and 250 deg. C. and the times from on the order of magnitude of a minute at the higher temperature to the order of magnitude of a week at the lower temperature. It will be well known to one skilled in the art of free radical polymer chemistry that the choice of initiator strongly influences the necessary cure temperature and time. If the cure is allowed to take 10 hours, then a reasonable temperature range is around the temperature at which the initiator has a 10 hour half life. Shorter cure times require higher temperatures.

It will be evident to one skilled in the art of adhesive formulation that other additives such as fillers, reinforcing agents, coupling agents, colorants, odorants, other comonomers, resins, tackifiers, plasticizers, lubricants, stabilizers, antistats, and the like can optionally be added. It is a further option to add additional amounts of a polyol acrylate to increase the crosslink density and give a more firmly cured product, or conversely to add a monoacrylate or a thermoplastic resin to get a softer more pliable product. The invention will be made clearer by reference to the following examples presented for purposes of illustration and not for limitation, and for purposes of setting forth the best mode contemplated for carrying out the invention.

To further set forth the best mode of carrying out the invention, the following examples, which are not to be construed as limiting, are given:

EXAMPLE 1:

Preparation of a precursor aminoamide polymer.

Polyaminoamides were produced by adding all the reactive ingredients (acids and amines) to a flask and heating under nitrogen for a two hour period to 225°–250° C. This temperature was maintained with stirring over a two hour period under nitrogen and for an additional two hours under a vacuum of 25–30" (Hg). The resins were then cooled rapidly to ambient temperature.

Resin (a): The components used were polymeric fatty acid (Unidyme 14) (78 equiv. %), linear dicarboxylic acid (14 equiv. %), linear monocarboxylic acid (8 equiv. %), piperazine (54 equiv. %), and linear short chain diamine (64 equiv. %). In some cases, stabilizers were added. The product resin has a viscosity of 240 centipoise at 190° C., a ring and ball softening point of 134° C., an acid number of 3.3 and an amine number of 22.8.

Resin (b): The same procedure was followed but the components were polymeric fatty acid (83 equiv. %), linear dicarboxylic acid (13 equiv. %), linear monocarboxylic acid (4 equiv. %), piperazine (58 equiv. %) and linear short chain diamine (50 equiv. %). The product had a viscosity of 1800 centipoise at 225° C., a ring and ball softening point of 125° C., an acid number of 1.0 and an amine number of 4.8.

EXAMPLE 2:

Preparation of uncured product resin of the invention.

The aminoamide resin (a) made in example 1 was powdered by grinding with solid carbon dioxide ("Dry Ice"). To 200 g. of this resin was added 36 g. of trimethylolpropane triacrylate, 0.4 g. of hydroquinone, and 2.0 g. of dicumyl peroxide. After blending, the mixture was extruded through a Brabender twin screw extruder at 110° C. and a ribbon die at 100° C. during which time (about 2 minutes) it could be shown by infrared that the Michael reaction had substantially completed itself. The product was then cooled and rolled up.

EXAMPLE 3:

Curing of the product resin of the preceding example.

The modified aminoamide resin product of example 2 was heated at 180° C. for 30 minutes. The resultant cured product was no longer meltable, even at 230° C. The product was insoluble in refluxing toluene, butanol, isopropanol (1:2:1, v/v/v), which dissolved almost all dimer-based polyamides, including the precursor resins.

EXAMPLE 4:

Preparation of another uncured product resin of the invention.

The product (b) of example 1 was ground with dry ice and to 200 g. of the ground resin was added 7 g. of trimethylolpropane triacrylate, 0.4 g. of hydroquinone, and 2.0 g. of dicumyl peroxide. After blending together, the mixture was extruded through a Brabender twin screw extruder at 110° C. and a ribbon die at 100° C. over 2 minutes, during which time the Michael addition reaction was substantially completed as could be shown by infrared. The product was cooled and rolled up.

EXAMPLE 5:

Curing of the product resin of the preceding example.

The modified aminoamide resin product of example 4 was heated at 180° C. for 30 minutes. The product was no longer meltable at 230° C. showing that it had cured. The product was insoluble in refluxing toluene, butanol, isopropanol (1:2:1, v/v/v), which dissolved almost all dimer-based polyamides, including the precursor resins.

EXAMPLE 6:

Reaction in solvent medium (ethylene dichloride).

To a solution of 150 parts (all quantities by weight) pentaerythritol tetraacrylate and 0.8 parts of hydroquinone in a solvent quantity of ethylene dichloride was added 100 parts of an amino-terminated polyamide (made from "dimer-14 acid," which is a distilled dicarboxylic acid fraction from the crude dimer acid, ethylenediamine, and piperazine), the aminoamide having an amine number of 41. After stirring for 3 days at room temperature, a small portion is removed for analysis and to the remainder (the bulk of the reaction mixture) 1 part of dicumyl peroxide is added and the solvent is then removed under vacuum. The analytical sample is treated as follows: the solvent is partly removed and ether-acetone is added to precipitate polymer. The nmr analysis of the waxy polymer thus precipitated shows the presence of both acrylate and amide structures, the ratio of acrylate groups (olefinic hydrogens at 5.8–6.2 ppm chemical shift relative to the tetramethylsilane reference) to pentaerythritol methylene groups (at 4.0–4.5 ppm) being reduced relative to the ratio in the starting material.

The product after evaporation of the solvent is found to be curable by heating for 40 minutes at 190° C. When employed as a hot melt adhesive for the construction of a laminated wood product, it gave initially good adhesion when applied at 160° C. but could be rendered nonthermoplastic and the strength of the bond increased (in respect to heat and moisture) by thermal curing at 190° C. for 40 minutes.

EXAMPLE 7

The reaction of the preceding example is repeated but the ratio of pentaerythritol tetraacrylate to the polyamide is 1.1:1 by weight, 1% hydroquinone was used, and the reaction was run at 85°–90° C. for 5 hours. After addition of 1% (based on the weight of the two reactants) of dicumyl peroxide, the solvent is then stripped under vacuum. The resulting product exhibits nmr bands of both acrylate and amide, but the olefinic proton to pentaerythritol methylene proton ratio is 1.19:1 (compared to the starting acrylate in which it is 1.5:1.

I claim:

1. A thermally curable acrylate modified aminoamide resin which comprises:
   (a) the Michael addition product of an aminoamide thermoplastic polymer having an amine number greater than about 1 and less than about 100, with a polyol ester having a multiplicity of acrylate ester groups, the initial ratio of the acrylate groups of the polyol ester to the amino functional groups of the aminoamide polymer being greater than 0.5 and less than about 8.0; and
   (b) an effective amount of an initiator for thermal curing.

2. A thermally-curable acrylate-modified aminoamide resin as defined in claim 1 wherein said aminoamide thermoplastic polymer is derived from a polymerized unsaturated fatty acid.

3. A thermally-curable acrylate-modified aminoamide resin as defined in claim 1 wherein said aminoamide thermoplastic polymer is derived from dimer acid.

4. A thermally-curable acrylate-modified aminoamide resin as defined in claim 1 wherein said aminoamide thermoplastic polymer is derived from a polymerized unsaturated fatty acid, linear dicarboxylic acid, piperazine, and a linear short chain diamine.

5. A thermally-curable acrylate-modified aminoamide resin as defined in claim 1 wherein said aminoamide thermoplastic polymer is an amino-terminated aminoamide derived from the dicarboxylic acid fraction of dimer acid, linear acid, piperazine, and ethylenediamine.

6. A thermally-curable acrylate-modified aminoamide resin as defined in claim 3 wherein said aminoamide thermoplastic polymer is derived from dimer, linear acid, piperazine, short chain diamines, and polyether diamine.

7. A thermally-curable acrylate-modified aminoamide resin as defined in claim 3 wherein said aminoamide thermoplastic polymer is derived from dimer, linear acid, and short chain diamines.

8. A thermally-curable acrylate-modified aminoamide resin as defined in claim 3 wherein said aminoamide thermoplastic polymer is derived from dimer, linear dicarboxylic acid, dimer diamine, short chain diamines, and polyether diamine.

9. A thermally-curable acrylate-modified aminoamide resin as defined in claim 1 wherein said aminoamide thermoplastic polymer has an amine number of between about 3 and about 40.

10. A thermally-curable acrylate-modified aminoamide resin as defined in claim 1 wherein said polyol ester is a polyol ester triacrylate.

11. A thermally-curable acrylate-modified aminoamide resin as defined in claim 1 wherein said polyol ester is pentaerythritol tetraacrylate.

12. A thermally-curable acrylate-modified aminoamide resin as defined in claim 1 wherein said aminoamide thermoplastic polymer is derived from a polymerized unsaturated fatty acid, a linear aliphatic dicarboxylic acid, piperazine, and a linear short chain diamine, and has an amine number between about 3 and about 40, and wherein said polyol ester is trimethylolpropane triacrylate, and wherein said initiator is dicumyl peroxide.

13. A thermally-curable acrylate-modified aminoamide resin as defined in claim 1 in which said initiator is a free radical curing initiator having a 10 hour half life of at least about 50 degrees Centigrade.

14. A method of manufacturing an acrylate-modified aminoamide resin which comprises admixing an aminoamide thermoplastic polymer having an amine number greater than about 1 and less than about 100, with a polyol ester having a multiplicity of acrylate ester groups, the initial ratio of the acrylate groups of the polyol ester to the amino-hydrogen functional groups of the aminoamide polymer being greater than 0.5 to less than about 8.0, and heating until the Michael addition reaction is substantially completed, and adding an effective amount of an initiator for thermal curing.

15. A method of producing a thermally cured resin which comprises applying to the site where such resin is to be applied the Michael addition product of an aminoamide thermoplastic polymer having an amine number greater than about 1 and less than about 100, with a polyol ester having a plurality of acrylate groups, the initial ratio of the acrylate groups of the polyol ester to the amino functional groups of the aminoamide polymer being greater than 0.5 to less than about 8.0, said resin containing an effective amount of a thermal cure initiator, and heating until curing is substantially complete.

16. The thermally cured product made by heating the composition of claim 1 until curing is substantially complete.

17. A thermally-curable acrylate-modified aminoamide resin as defined in claim 10 wherein said polyol ester triacrylate is selected from the group consisting of trimethylolpropane triacrylate, ethoxylated trimethylolpropane triacrylate, and trimethylolpropane trimethacrylate.

* * * * *